United States Patent [19]
Takahashi

[11] 3,989,011
[45] Nov. 2, 1976

[54] CONSTANT PRESSURE HEATING VANE ROTARY ENGINE

[76] Inventor: Minoru Takahashi, 4533, Eda, Midori, Yokohama, Kanagawa, Japan

[22] Filed: Dec. 10, 1974

[21] Appl. No.: 531,244

[30] Foreign Application Priority Data
Jan. 25, 1974 Japan.............................. 49-11260

[52] U.S. Cl................................. 123/8.15; 418/91; 123/8.23
[51] Int. Cl.$^2$.................. F02B 55/14; F02B 53/08; F01C 21/06
[58] Field of Search................. 123/8.05, 8.15, 8.23; 60/39.17; 418/91

[56] References Cited
UNITED STATES PATENTS

| | | |
|---|---|---|
| 3,333,763 | 8/1967 | Jungbluth et al. ..................... 418/91 |
| 3,529,909 | 9/1970 | Klover ................................. 418/91 |
| 3,724,427 | 4/1973 | Sauder .............................. 123/8.15 |
| 3,782,110 | 1/1974 | Kobayashi......................... 60/39.17 |
| 3,844,117 | 10/1974 | Ryan................................ 123/8.23 |

*Primary Examiner*—William L. Freeh
*Attorney, Agent, or Firm*—J. Gibson Semmes

[57] ABSTRACT

A new type of engine, which incorporates rotors each equipped with a plurality of vanes and has a volume of a portion necessary for constant pressure heating expansion turned into a volume of an air motor side, is composed by functionally combining vane rotary air compressors and vane rotary air motors. More particularly, there is an engine conception mainly intended for vehicles of solving, without reducing the engine efficiency, problems concerning complete combustion and prevention of nitric oxide production, which have been generally considered it difficult to realize by reciprocating engines.

1 Claim, 6 Drawing Figures

CONSTANT PRESSURE HEATING VANE ROTARY ENGINE

The present invention mainly relates to engines for vehicles and more particularly to a new type of constant pressure heating vane rotary engine wherein vane rotary air compressors and vane rotary air motors are arranged on the same axial line, combustion chambers for continuous combustion being provided respectively in front of each of the vane rotary air motors.

At present, reciprocating engines of a constant volume heating and spark ignition system are generally used as engines for vehicles.

Normally, it is the most handy method for improving the efficiency of internal engines to improve the compression ratio of mixed gases. However, in the turbofan engines, it is extremely difficult to improve this compression ratio. For example, this problem is solved by increasing the number of the stages of the compressors. However, increase of the number of the stages of the compressor as engines for vehicles is not preferable, since it is subjected to structural and economical limitations. In this point, the reciprocating engines, which are generally used as engines for the vehicles at present time, are more efficient. However, the compression ratio of this reciprocating engine reduces the output eventually due to occurrence of detonation as a result of the constant volume combustion. Therefore, in using the common gasoline, it is very difficult for a limit of compression ratio to exceed 10 : 1. In order to exceed this compression ratio limit, the use of a fuel of higher octane value or an alcohol fuel is taken into consideration, but this method is not always preferable in terms of harmful gas production and economics.

Also, the reciprocating engines used generally as the vehicle engines have adopted a constant volume heating method as its combustion method. Upon requirement of the highest torque, the temperatures and pressures become higher excessively, thus causing the nitric oxide to be produced or the knocking phenomenon to be taken place. Accordingly, the output thereof has to be controlled. Also, since the heating operation is intermittent, the average output between the heating and the heating can not be expected. In addition, in the engines for the vehicles, the spark ignition system is generally adopted. In the sudden acceleration of the vehicles or the slow running thereof, the gas mixture ratio is unbalanced, and thus miss-fires are likely to be caused. Thus, the incomplete combustion occurs, thus producing unburned gases CxHx and carbon monoxide CO, which are largely responsible for exhaust gas pollution due to the vehicles.

Accordingly, it is an object of the present invention to provide a constant pressure heating vane rotary engine which is capable of fundamentally solving problems inherent in the conventional reciprocating engines and is simplified in construction and higher in performance.

It is another object of the present invention to provide a constant pressure heating vane rotary engine, wherein the heating level of the highest pressure and the highest temperatures in an allowable range are maintained thereby to prevent the nitric oxide production and the knocking phenomenon, by adoption of the constant pressure constant system as an engine heating system.

It is a further object of the present invention to provide a constant pressure heating vane rotary engine, wherein if excessive amount of air is supplied, the miss-fires do not occur and thus the unburned gases or the carbon monoxide is prevented from being caused, by adoption of a continuous combustion method, instead of an intermittent spark ignition system, as a combustion method of the engines.

It is a still further object of the present invention to provide a constant pressure heating vane rotary engine which is capable of effecting smoother partial load running, without the functions during its continuous operation and even at its low speed, by use of the vane rotary, which changes in volume mechanically, as the air compressor.

These and other objects, and the new features will be apparent more fully from a reading of the following detailed description with reference to the accompanying drawings. It is to be expressly understood, however, that the drawings are for purpose of illustration only and are not intended as a definition of the limits of the invention.

Figure 1:
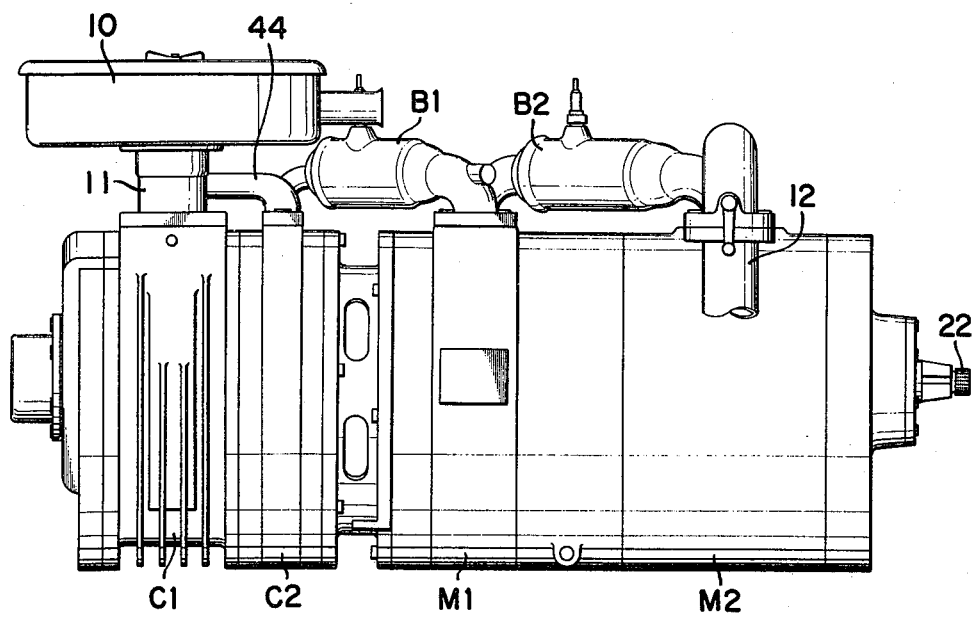
FIG. 1 is an elevational view showing appearance of a constant pressure heating vane rotary engine in a preferred embodiment of the present invention.
Figure 2:
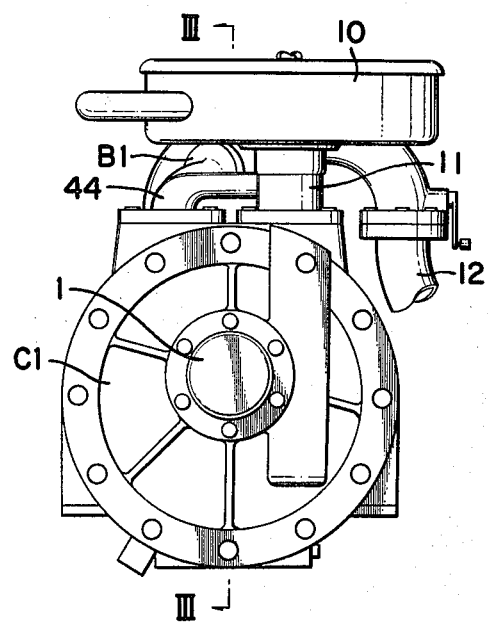
FIG. 2 is a side view thereof.

FIGS. 1 and 2 show appearance of a rotary pressure heating vane rotary engine of the present invention respectively. Referring to both drawings, the schematic construction of the engine will be described hereinafter. This engine has two units of air compressors C and two units of air motors M arranged functionally on the same axial line respectively. The combustion chamber B is mounted in a portion just in front of the respective entrance of the primary air motor M1 and of the secondary air motor M2. A suction pipe 11 communicating with the air cleaner 10 is mounted on the inlet side of the primary air compressor C1 and an exhaust pipe 12 is mounted on the outlet side of the secondary air motor M2. Namely, the constant pressure heating vane rotary engine of the present invention is similar, in form, to the functions of the gas turbine engine, but as described later, a volume change mechanism of the vane rotary is used as a system of the compression and expansion. The constant pressure heating vane rotary engine is characterized in this point as compared with the gas turbine engine. In addition, the partial load running which has been considered unfit due to this compression feature in the convention gas turbine engine is made possible in a wide range, and the constant pressure heating vane rotary engine will not be worse in compression efficiency, as the gas turbine engine, despite the small size of the vane rotary. Accordingly, the constant pressure heating vane rotary engine is capable of displaying the optimum condition when the idling running like the vehicle engines is normally required.

Figure 3:
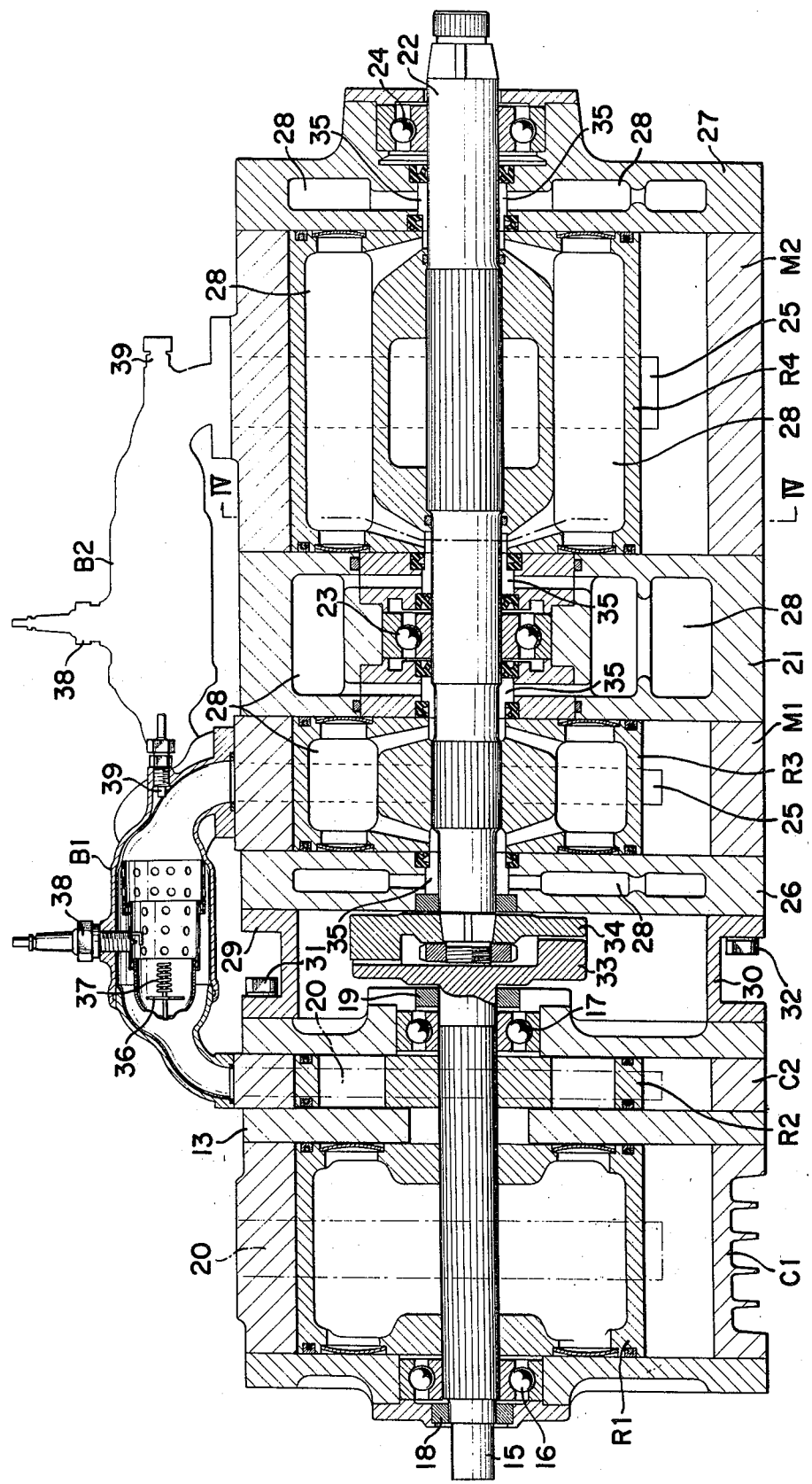
FIG. 3 shows the inner structure of the constant pressure heating vane rotary engine and is a cross-sectional view taken on line III — III of FIG. 1 in a condition where an air chamber is removed.
Figure 4:
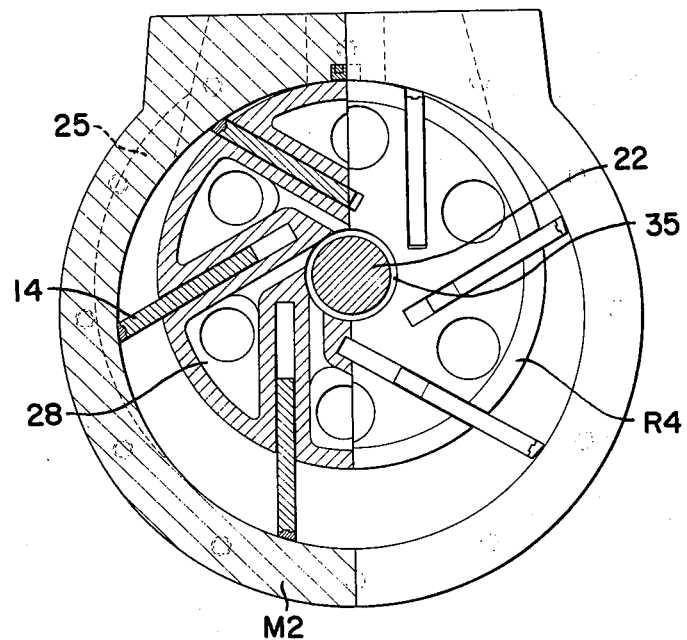
FIG. 4 is a partial cross-sectional view taken on line IV — IV of FIG. 3, also.

FIGS. 3 and 4 show the internal structure of the constant pressure heating vane rotary engine of the present invention respectively. FIG. 3 is a cross-sectional view seen from the side face of the engine. FIG. 4 is a partially cross-sectional view seen from the front face thereof. Referring to both drawings, the internal structure of the engine will be described hereinafter more fully.

This engine is composed of two units of air compressors C and two units of air motors M. The air compressor C and the air motor M, each accommodating a rotor having plurality of vanes inside a cylinder with gas introducing grooves on the inner wall thereof, are the same in construction as the so-called vane rotary respectively. In this embodiment, the engine is divided into the air compressor C side and the air motor M side owing to constructional circumstances. Namely, this is based on requirement for reducing the mutual heat interference, since the circumstances are different between a case where the vane rotary is used as the air compressor, and a case where it is used as the air motor.

The two units of air compressors C are divided into a primary side C1 and a secondary side C2 by means of a mid-partition wall 13, each side including a rotor R equipped with a plurality of vanes 14. A rotor R1 of the primary air compressor C1 and a rotor R2 of the secondary air compressor C2 are secured to a common driving shaft 15. Furthermore, this driving shaft 15 is carried on the bearings 16 and 17, and is adapted to rotate by, for example, a spline system. The primary air compressor C1 and the secondary air compressor C2 are hermetically sealed by seals 18 and 19. Numeral 20 is a gas introducing groove provided on the inner wall on an entrance side of the air compressor C.

The two units of air motors M are approximately the same in construction as the air compressors C. Namely, the primary air motor M1 and the secondary air motor M2 are separated from each other by a mid-partition wall 21, each motor including a rotor R equipped with a plurality of vanes 14. A rotor R3 of the primary air motor M1 and a rotor R4 of the secondary air motor M2 are secured to the same output shaft 22, which is adapted to be carried and rotated by the bearings 23 and 24. Numeral 25 is a gas exhausting groove provided on the inner wall on an exit side of the air motor M. A water jacket 28 which serves as a cooling water passage of the engine is formed on the rotor R3 of the primary air motor M1, the rotor R4 of the secondary air motor M2, the mid-partition wall 21 and cylinder covers 26, 27 as described later.

In this embodiment, in order to simplify the engine construction, it is adopted to rotate in the same axial line. The air compressor C and the air motor M are properly spaced by members 29, 30, and the bolts 31, 32. The driving shaft 15 on the air compressor C side and the output shaft 22 on the air motor M side are coupled by the couplings 33 and 34. The air compressors C and the air motors M are not always required to be arranged on the same axial line as described hereinabove, and may be coupled properly by the other known means.

The air volumes of the air compressor C and the air motor M are determined by an air compression coefficient of the air compressor C side and an air expansion coefficient of the air motor M side. Namely, in this embodiment, a compression ratio of 4 : 1 is composed in two-stage type so that the compression ratio of 16 : 1 may be obtained collectively. Also, in order to accommodate the gas volume to be expanded under the constant pressure heating, the volume of the air motor M side is designed so that the volumes of the primary air motor M1 and the secondary air motor M2 may be larger by that portion than the values of the primary air compressor C1 and the secondary air compressor C2. This volume increase portion influences directly upon the torque, and appears as output to the exterior portion. Accordingly, if the differences in volume between the air compressor C and the air motor M are larger, the larger output will be generated, whereby the effevtive engine is provided.

The water jackets 28 which serve as cooling water passages of the engine is provided respectively in the cylinder covers 26, 27 of the air motor M side, the mid-partition wall 21, the rotor R3 of the primary air motor M1 and the rotor R4 of the secondary air motor M2. The water jackets 28 are intercommunicated with a passage 35 formed along the outer face of the output shaft 22 of the air motor M. The cooling water of the engine is adapted to pass through this passage 35 from the cylinder cover 26 side, and to pass through the water jackets 28 of the rotor R3, the mid-partition wall 21 and the rotor R4 respectively to the cylinder cover 27 side.

Reference characters B1 and B2 show a primary combustion chamber of the engine, and a secondary combustion chamber thereof respectively. The primary combustion chamber B1 and the secondary combustion chamber B2 are arranged in front of the primary air motor M1 and in front of the secondary air motor M2 respectively. The primary combustion chamber B1 and the secondary combustion chamber B2 are the same in construction and accommodates a heat retaining coil 37 equipped with a reflection plate 36 therein. In this engine, its start is effected by an ignition plug 38 mounted on the outer wall of the combustion chamber B. However, after the engine starting, the heat retaining coil 37 becomes red-hot and is adapted to normally heat and burn the mixed gases continuously. Fuel is injected into the combustion chamber B from a fuel injection hole 39.

Figure 5:
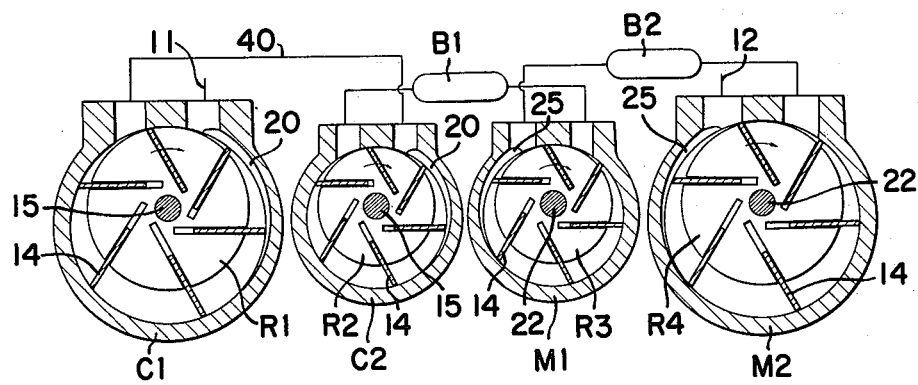
FIG. 5 is a system view showing a system of intake, compression, heating, expansion and exhaust of the constant heating vane rotary engine.

FIG. 5 is a system view showing the stages of intake, compression, heating, expansion and exhaust of the engine. Referring to the drawings, the air sucked into the primary air compressor C1 through the gas introducing groove 20 from the suction pipe 11 is compressed by the rotor R1 and the vanes 14 of the primary air compressor C1 and is supplied under pressures into the secondary air compressor C2 through a connection pipe 40. And furthermore, the air is compressed by rotation of the rotor R2 and the vanes 14 of the secondary air compressor C2. The compression ratio at this time is 16 : 1 in this embodiment. The air compressed by the primary air compressor C1 and the secondary air compressor C2 is supplied to the primary combustion chamber B1, where the air is mixed with the fuel, heated, burned and expanded, whereby the primary air motor M1 is rotated. The gas exhausted from the primary air motor M1 is further mixed with the fuel in the secondary combustion chamber B2, is burned and expanded again. It is supplied into the secondary air motor M2 to generate the torque and is exhausted from the exhaust pipe outwardly through the gas exhaust groove 25. In the constant pressure heating vane rotary engine of the present invention, installation of the secondary combustion chamber B2 is indispensable. Namely, in a case where heating expansion is effected by the primary combustion chamber B1 only, output of the engine per volume becomes low unless the maximum temperature of the primary air motor M1 rises. In increasing the temperature, the mixed gases are thermally cracked. On the contrary, the heating temperature is lowered or nitric oxide may be produced. Accordingly, the highest combustion temperature is required to be controlled up to a limit temperature at which the mixed gases are thermally cracked, namely, approximately 1,500° C by installation of the secondary combustion chamber B2.

Figure 6:
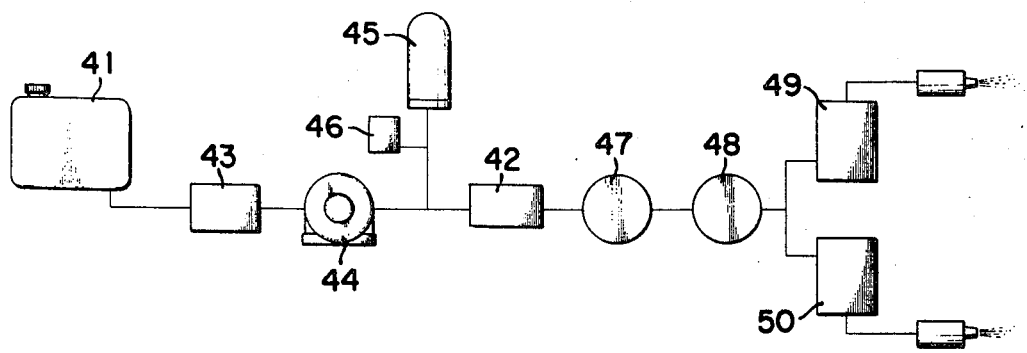
FIG. 6 is a fuel control system view of the engine.

FIG. 6 shows a fuel control system of this engine. The fuel supplied from the fuel tank 41 is controlled by a fuel switch 42, which operatively cooperates with a starting switch, and is supplied under pressure to the engine side, through a strainer 43, by a motor type pressure transfer pump 44. Numeral 45 is an accumulator, numeral 46 being a pressure switch. The fuel supplied to the engine side is controlled by a controlling valve 47 and an electromagnetic proportional controlling valve 48 to prevent the excessive fuel supply, the controlling valve turning on and off as a start confirming action by load of intake air inside the air compressor C, the electromagnetic proportional controlling valve controlling a maximum value of a fuel supply amount in proportion to revolution number of the air motor M. Numerals 49 and 50 are accelerator controlling valves for controlling the fuel to be supplied respectively to the primary combustion chamber B1 and the secondary combustion chamber B2.

In the recent gas turbine engines, some of them reach thirty in pressure ratio. However, in the Diesel engines, many of them may become thirty atmospheric pressures in pressures inside the cylinder at a compression ratio of 16 : 1. Accordingly, in the constant pressure heating vane rotary engine of the present invention, the compression ratio of 16 : 1 can be obtained readily if the compression ratio of the vane rotary is 4 : 1 of two-stage type. Since the temperature rise due to adiabatic compression at this time is 450° to about 600° C according to computation, the volume change due to the expansion becomes 1.35 times to 1.65 times as compared with the volume immediately before the heating if the temperature rise due to the constant pressure heating is controlled to 900° C and becomes 2.05 times to 2.45 times if the temperature rise is controlled to 1,500° C. This fact shows the possibility of the above-mentioned magnification or more by the construction material quality of the engine and the cooling condition thereof.

Moreover, since a substantial amount of the excessive air is required to retain this limit temperature, no harmful gases due to incomplete combustion are not produced. Also, to have this temperature, the maximum temperature is a heating operation in an effective range, and thus no nitric oxide can be produced.

Furthermore, in this engine, since the gas current does not rotate inversely per cycle hydrodynamically like the reciprocating engine, the charging efficiency can be improved. As one advantage of a given direction current, differences in temperature among gases inside the engine or among the gases and the machines can be reduced. Accordingly, the gases are prevented from being contacted to retain the effective pressure, whereby the engine efficiency can be increased.

Also, since majority of the effective pressures can be used and converted into the output by use of the primary air motor M1 and the secondary air motor, the present invention has unprecedented superior features to the engines using heat energies as form of the torque. Since the exhaust operation can be effected as an exhaust condition with less atmospheric pressure pulsation, the resistances in the silencer can be reduced.

The invention has been described in its preferred form with a certain degree of particularity. As many apparently widely embodiments of this invention may be made without departing from the spirit and scope thereof, it is to be understood that the invention is not limited to the specific embodiments thereof except as defined in the appended claims.

What is claimed is:

1. In a constant pressure heating vane rotary engine, plural air compressors including a primary and a secondary side, and plural air motors of substantially similar construction as said air compressors and including a primary and a secondary side, and each comprised of a rotary vane construction with a common operating shaft for the rotary vanes of said compressors and air motors respectively, said compressors and said air motors being functionally and operatively combined with couplings therebetween, said air compressors being operable to produce an air volume of an extent necessary for constant pressure heating expansion being turned into an adequate volume on the air motor side; said air compressors and said air motors being all respectively operatively coupled by progressively extending connection pipes, each said pipe serving as a gas passage; a combustion chamber operatively mounted respectively in front of the entrance to each said air motor, a water jacket being provided respectively in each of the rotors incorporated by the two units of air motors, a fluid passage being provided along an output shaft to which the two units of rotors are secured, a cylinder cover for the air motors including a water jacket, and the water jacket mounted in the rotor being communicated with the water jacket mounted in the cylinder cover by said passage.

* * * * *